US012731980B2

(12) United States Patent
Kapaun et al.

(10) Patent No.: US 12,731,980 B2
(45) Date of Patent: Sep. 8, 2026

(54) PROTECTION IN A DIRECT CURRENT HIGH VOLTAGE ELECTRIC SYSTEM

(71) Applicant: Airbus SAS, Blagnac (FR)

(72) Inventors: Florian Kapaun, Blagnac (FR); Gerhard Steiner, Blagnac (FR)

(73) Assignee: Airbus SAS, Blagnac (FR)

( * ) Notice: Subject to any disclaimer, the term of this patent is extended or adjusted under 35 U.S.C. 154(b) by 219 days.

(21) Appl. No.: 18/646,143

(22) Filed: Apr. 25, 2024

(65) Prior Publication Data

US 2024/0364095 A1 Oct. 31, 2024

(30) Foreign Application Priority Data

Apr. 27, 2023 (EP) .................................... 23170425

(51) Int. Cl.
*H02H 3/10* (2006.01)
*B64D 45/00* (2006.01)

(52) U.S. Cl.
CPC ............... *H02H 3/10* (2013.01); *B64D 45/00* (2013.01)

(58) Field of Classification Search
CPC ................................. H02H 3/10; B64D 45/00
See application file for complete search history.

(56) References Cited

U.S. PATENT DOCUMENTS 5,233,495 A * 8/1993 De Palma ........ H03K 17/08144 361/13
5,923,513 A 7/1999 Pelly
11,973,493 B2 * 4/2024 Song .................... H03K 17/082
2005/0146814 A1 7/2005 Sellier et al.
2013/0285615 A1 * 10/2013 Vieillard ................ H02J 7/345 320/167
2016/0273508 A1 * 9/2016 Ishii ........................ F02P 3/055
2017/0373591 A1 * 12/2017 Imai ................ G11C 29/12005
2018/0301295 A1 * 10/2018 Dupraz .................. H02H 3/021

FOREIGN PATENT DOCUMENTS

WO 2020106964 A1 5/2020

OTHER PUBLICATIONS

European Search Report for corresponding European Patent Application No. 23170425.5 dated Oct. 2, 2023.

* cited by examiner

*Primary Examiner* — Scott Bauer
(74) *Attorney, Agent, or Firm* — Greer, Burns & Crain, Ltd.

(57) ABSTRACT

An electrical arrangement for protection in a direct current high voltage electric system comprises an input connection with an input terminal, an output connection with a output terminal, a main disconnection component between the input terminal and the output terminal and at least one clamping circuit between the input terminal and the output terminal. The clamping circuit has a first connecting path and a second connecting path, arranged in parallel to each other. The first connection path comprises a storage coupling for temporarily buffering an overvoltage present between the input terminal and the output terminal. The first connection path also comprises an activatable switch for selectably connecting the storage coupling with the output terminal. The second connection path comprises a supply coupling for operating the activatable switch in dependency of the overvoltage.

16 Claims, 5 Drawing Sheets

PROTECTION IN A DIRECT CURRENT HIGH VOLTAGE ELECTRIC SYSTEM

CROSS-REFERENCES TO RELATED APPLICATIONS

This application claims the benefit of European Patent Application Number 23170425.5 filed on Apr. 27, 2023, the entire disclosure of which is incorporated herein by way of reference.

FIELD OF THE INVENTION

The present invention relates to an electrical arrangement for protection in a direct current high voltage electric system, to an electric system with a direct current network, to an aircraft and to a method for protected switching in a direct current high voltage electric system.

BACKGROUND OF THE INVENTION

In electrical systems, switching components can be provided, such as for de-activating the system to avoid unwanted conditions. An example are switches or fuses that provide a temporal disconnection. For switching in a direct current high voltage electric system, additional measures, like clamping circuits, need to be provided to avoid a temporal overload situation due to the switching-off. However, it has been shown that clamping devices like varistors and Zener diodes require a complex matching procedure and may result in rather bulky arrangements.

SUMMARY OF THE INVENTION

There may thus be a need for improved measures for supporting disconnections in a high voltage network.

The object of the present invention may be solved by the subject-matter of one or more embodiments described herein. It should be noted that the following described aspects of the invention apply also for the electrical arrangement for protection in a direct current high voltage electric system, for the electric system with a direct current network and for the method for protected switching in a direct current high voltage electric system.

According to the present invention, an electrical arrangement for protection in a direct current high voltage electric system is provided. The arrangement comprises an input connection with an input terminal, an output connection with an output terminal, a main disconnection component between the input terminal and the output terminal and at least one clamping circuit between the input terminal and the output terminal. The clamping circuit has a first connecting path and a second connecting path, arranged in parallel to each other. The first connection path comprises a storage coupling for temporarily buffering an overvoltage present between the input terminal and the output terminal and an activatable switch for selectably connecting the storage coupling with the output terminal. The second connection path comprises a supply coupling for operating the activatable switch in dependency of the overvoltage.

As an effect, in case of a disconnection of the main circuit, energy still present can be temporarily stored within the clamping circuit. The main switching element can thus be provided in a more efficient and targeted manner. In the event the main switch opening, the energy stored on the lines, e.g. due to inductance, can be absorbed by the clamping circuit.

In an example, the clamping circuit is arranged in parallel to a main switch or fuse.

According to an example, the main disconnection component is a safety element configured to open an electrical circuit in the direct current high voltage electric system in order to protect at least a part of the electrical circuit.

According to an example, the storage coupling comprises a capacitor and a first resistor in a parallel connection.

As an option, the storage coupling also comprises a second resistor in series with the parallel connection of the capacitor and the first resistor.

According to an example, the activatable switch comprises a semiconductor switch that is blocked in a first state and that provides a connection to the output terminal in a second state.

According to an example, the activatable switch comprises an enhancement type field-effect-transistor, which is connected to the storage coupling with its drain connector, to the output terminal with its source connector and to the supply coupling with its gate as control coupling.

According to an example, the supply coupling comprises a first coupling resistor and a second coupling resistor connected in series between the input terminal and the output terminal. A trigger element is provided that comprises an input voltage terminal connected to a connection point between the first coupling resistor and the second coupling resistor with its positive connector and to a reference voltage connection with its negative connector. The trigger element also comprises a supply voltage terminal connected to a supply source with its positive connector and to output terminal with its negative connector. When the voltage present at the connection point between the first coupling resistor and the second coupling resistor exceeds a predetermined threshold, the trigger element is configured to provide a switch supply voltage to the gate of the activatable switch in order to close the activatable switch for activating the storage coupling.

According to another example, the supply coupling comprises a first transorber, a second transorber and a third transorber connected in series. A supply resistor is connected to a connection point of the second transorber and the third transorber, and a supply diode connected between the supply resistor and the activatable switch. The diode is connected to the supply resistor with its anode end. Further, a supply filter capacitor is connected between a connection point of the supply resistor and the supply diode.

According to an example, a pull down resistor is connected between the gate and the output terminal. An overvoltage protection diode is connected between the gate and the output terminal.

According to an example, the electrical arrangement is provided as a bi-directional electrical arrangement. The input connection comprises a first input terminal and a second input terminal. The main disconnection component comprises a first main disconnection element between the first input terminal and the output terminal, and a second main disconnection element between the second input terminal and the output terminal. The clamping circuit is provided as a first clamping circuit between the first input terminal and a midpoint terminal, and a second clamping circuit is provided between the second input terminal and the midpoint terminal. The first clamping circuit has the first connecting path and the second connecting path; and the second clamping circuit has a third connecting path and a fourth connecting path, arranged in parallel to each other. The third connection path comprises a second storage coupling for temporarily buffering an overvoltage present between the second input terminal and the midpoint terminal, and a second activatable switch for selectably connecting the second storage coupling with the output terminal. The fourth connection path comprises a second supply coupling for operating the second activatable switch in dependency of the overvoltage. The second connection path and the fourth connection path are provided at least partly as a shared connection path.

According to the present invention, also an electric system with a direct current network is provide. The system comprises at least one source, at least one load and an electrical arrangement according to one of the preceding examples. The source is selected from the group of: batteries, super capacitors, fuel cells, solar cells, power network and combinations thereof. The at least one load comprises at least one of the group of: electrical engines, electric drives and motors, electric actuators. The source is connected to the at least one load via an electric connection. The electrical arrangement is provided within the electric connection such that the main disconnection component can temporarily disconnect the least one load from the source.

According to an example, the direct current network is provided on board of a vehicle comprising at least one of the group of an aircraft and an automotive.

According to an example, the electrical arrangement is configured to handle voltages larger than 800 V and currents larger than 1000 A.

According to the present invention, also an aircraft is provided. The aircraft comprises a fuselage structure comprising a use portion, a lift and propulsion structure connected to the fuselage structure and an electric system with a direct current network according to one of the preceding examples. The electric system is configured to be at least temporarily used for an operation of the aircraft.

According to the present invention, also a method for protected switching in a direct current high voltage electric system is provided. The method comprises the steps of: providing an electrical arrangement for protection according to one of the preceding examples in the direct current high voltage electric system; and activating the main disconnection component. The clamping circuit is temporarily absorbing at least a part of an excess energy present as an overcurrent in the direct current high voltage electric system at the time of activating the main disconnection component.

According to an aspect, a component for disconnection in a high voltage circuit is supplemented with a topology that provides a buffer for temporarily storing energy that is still present when the disconnection of the circuit takes place by the component for disconnection. The topology also provides the possibility for draining the buffer automatically.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE PREFERRED EMBODIMENTS

Figure 1:
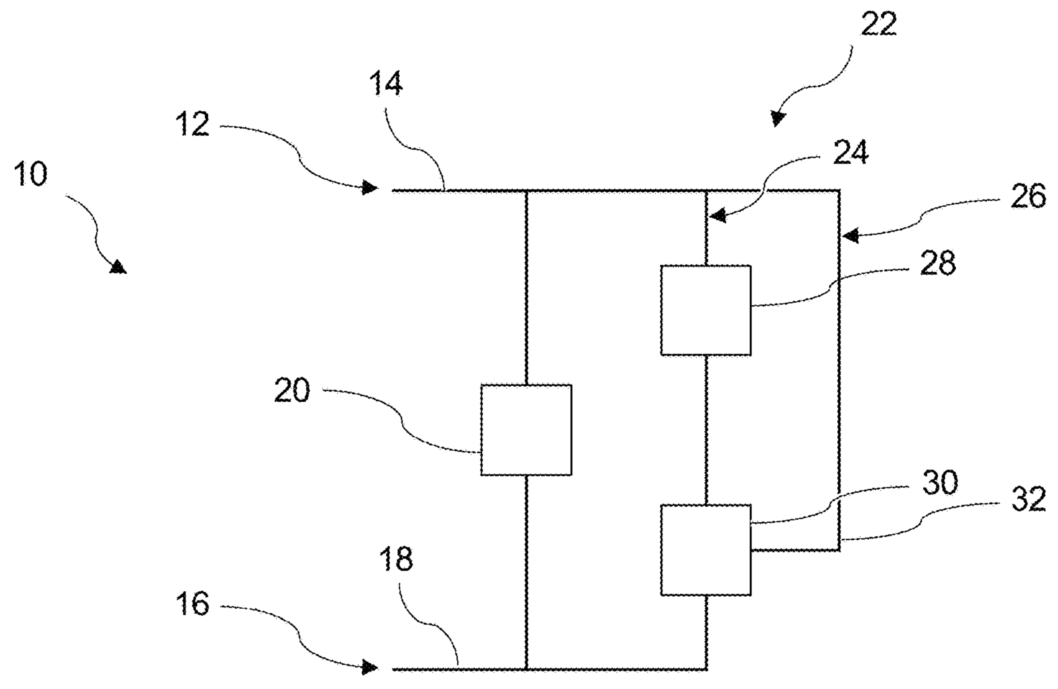
FIG. 1 schematically shows an example of an electrical arrangement for protection in a direct current high voltage electric system.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

Exemplary embodiments of the invention will be described in the following with reference to the following drawings:

FIG. 1 schematically shows an example of an electrical arrangement 10 for protection in a direct current high voltage electric system. The arrangement 10 comprises an input connection 12 with an input terminal 14. The arrangement 10 also comprises an output connection 16 with an output terminal 18. The arrangement 10 further comprises a main disconnection component 20 between the input terminal and the output terminal and at least one clamping circuit 22 between the input terminal 14 and the output terminal 18. The clamping circuit 22 has a first connecting path 24 and a second connecting path 26, arranged in parallel to each other. The first connection path 24 comprises a storage coupling 28 for temporarily buffering an overvoltage present between the input terminal 14 and the output terminal 18. The first connection path 24 also comprises an activatable switch 30 for selectably connecting the storage coupling 28 with the output terminal. The second connection path 26 comprises a supply coupling 32 for operating the activatable switch in dependency of the overvoltage.

The at least one clamping circuit 22 between the input terminal 14 and the output terminal 18 is connected in parallel to the main disconnection component.

The main disconnection component 20 provides a conducting state as a normal state. Only if a predetermined maximum current level is exceeded, the main disconnection component turns into a high-resistance state.

The main disconnection component 20 can also be referred to as main disconnector, main switch, main switchable component or main switching component.

In an example, the main disconnection component 20 acts like an electronic fuse.

In an example, the input terminal 14 is a positive input terminal and the output terminal 18 is a negative output terminal.

The clamping circuit 22 provides a controlled clamping circuit. The clamping circuit 22 provides the effect of absorbing an energy stored within the network or circuit when interrupting an electric current in the circuit.

As an example, the conductors provide an inductivity that results in urging to continue a current when suddenly interrupted.

The clamping circuit 22 provides a limitation or clamping of voltage when opening the circuit.

In a first option, the main disconnection component 20 is provided as a safety element configured to open an electrical circuit in the direct current high voltage electric system in order to protect at least a part of the electrical circuit.

In a second option, the main disconnection component 20 is provided as a fuse that opens the connection when exceeding a predetermined threshold current.

In an example, the main disconnection component 20 is a fuse within a positive conductor of a system circuit. As an example, the system circuit relates to an avionic system of an aircraft.

The storage coupling 28 is used to charge the capacitor when an overvoltage between the input terminal 14 and the output terminal 18 is detected.

In an example, the activatable switch 30 for selectably connecting the storage coupling with the output terminal is configured to activate the clamping circuit in case of an overcurrent.

Figure 2:
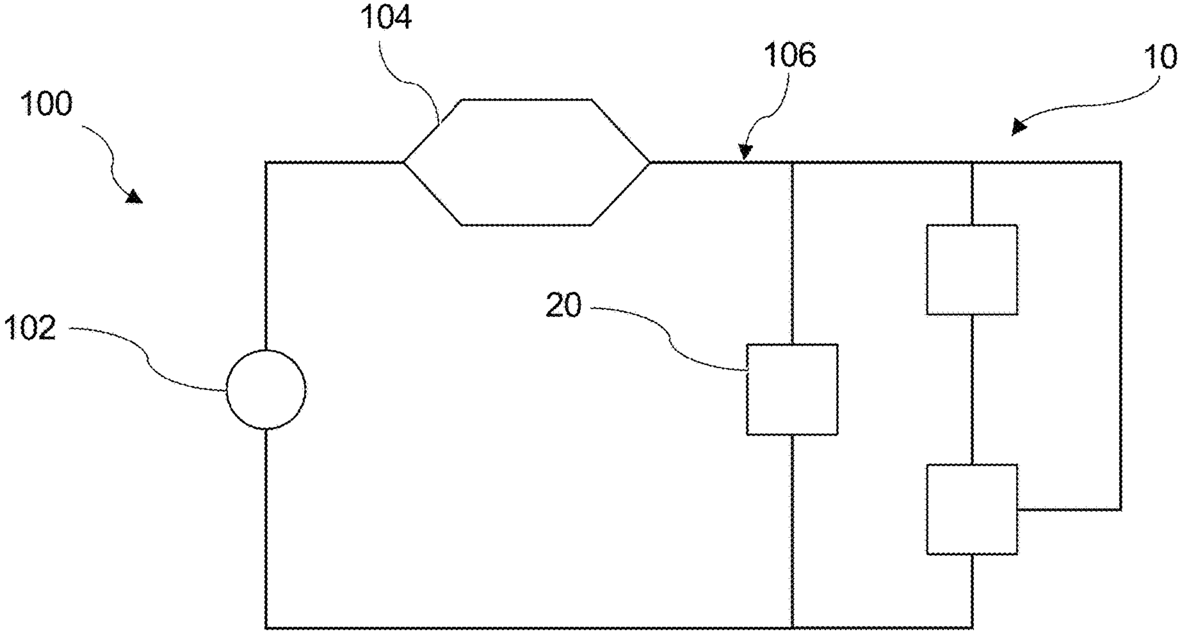
FIG. 2 shows an example of an electric system with a direct current network and the electrical arrangement of FIG. 1.

FIG. 2 shows an example of an electric system 100 with a direct current network. The electric system 100 comprises at least one source 102 and at least one load 104. The electric system 100 further comprises an example of the electrical arrangement 10 according to one of the examples above and below. The source 102 is selected from the group of: batteries, super capacitors, fuel cells, solar cells, power network and combinations thereof. The at least one load 104 comprises at least one of the group of: electrical engines, electric drives and motors, electric actuators. The source 102 is connected to the at least one load 104 via an electric connection 106. The electrical arrangement 10 is provided within the electric connection 106 such that the main disconnection component can temporarily disconnect the least one load 104 from the source 102.

In an example, the electric system 100 comprises multiple sources 102.

In an option, the direct current network is provided on board of a vehicle, such as an aircraft or an automotive.

In a further option, the electrical arrangement is configured to handle voltages larger than 800 V and currents larger than 1000 A.

Figure 3:
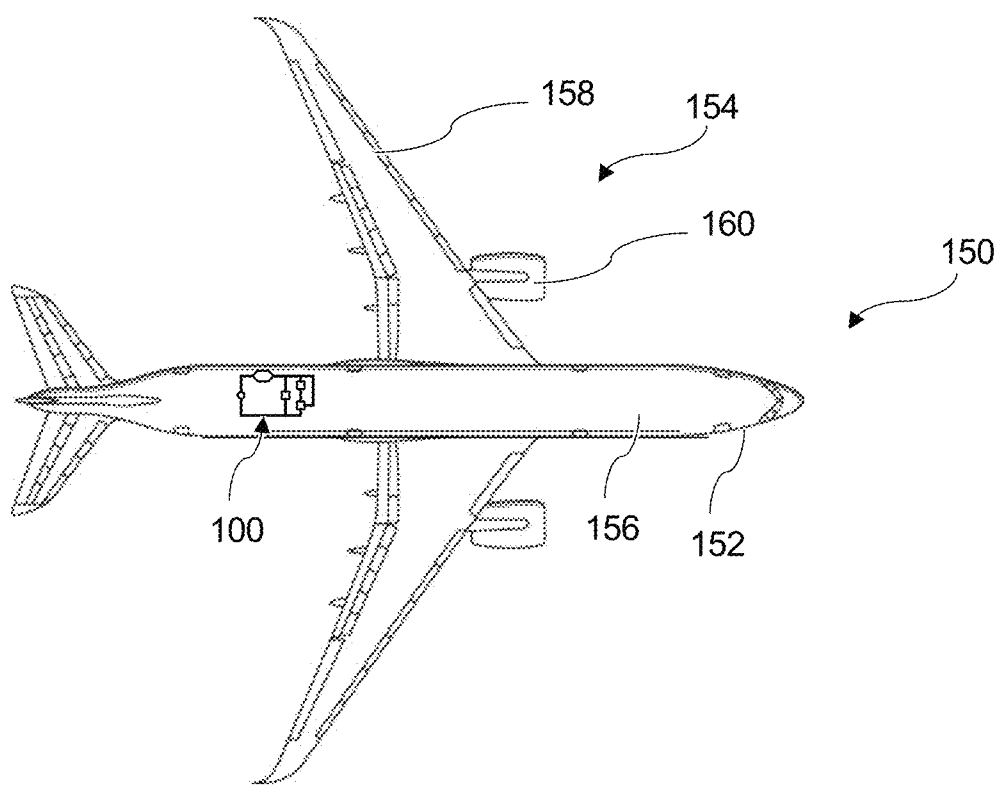
FIG. 3 shows an example of an aircraft.

FIG. 3 shows an example of an aircraft 150. The aircraft 150 comprises a fuselage structure 152 comprising a use portion. The aircraft 150 further comprises a lift and propulsion structure 154 connected to the fuselage structure 152. The aircraft 150 also comprises an example of the electric system 100 with a direct current network according to one of the examples above and below. The electric system 100 is configured to be at least temporarily used for an operation of the aircraft 150. For example, the electric system 100 is used for the propulsion or for adjusting flight components. As an example, the use portion is a cabin area 156 or a cargo area within the fuselage. The lift and propulsion structure 154 may comprise, among others, a pair of wings 158 and engines 160 mounted to the wings.

Figure 4:
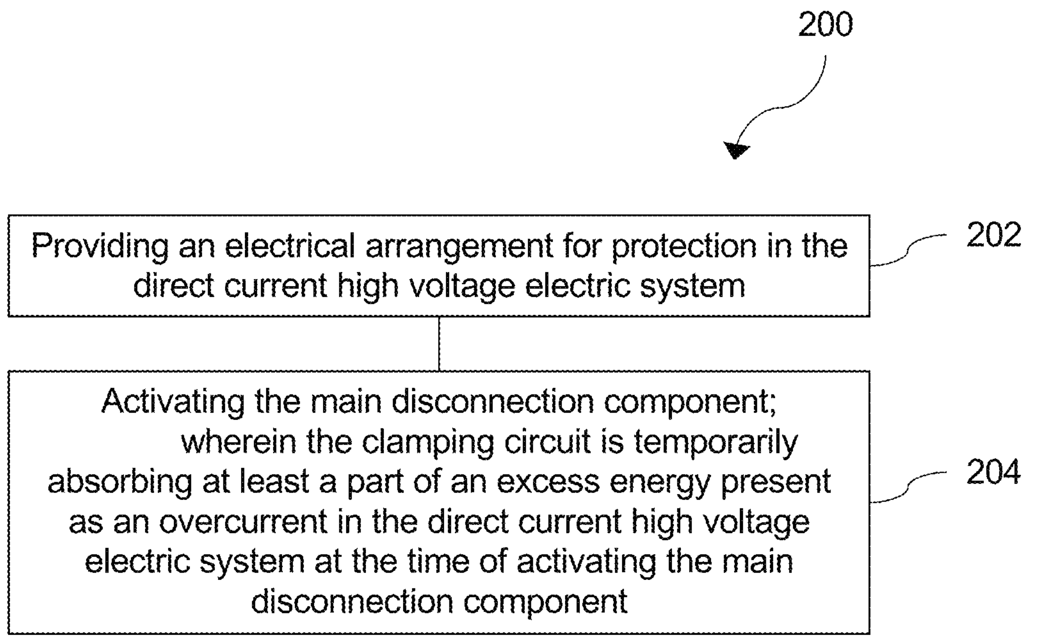
FIG. 4 shows basic steps of an example of a method for protected switching in a direct current high voltage electric system.

FIG. 4 shows basic steps of an example of a method 200 for protected switching in a direct current high voltage electric system. The method 200 comprises the following steps: In a first step 202, an electrical arrangement for protection according to one of the examples above and below are provided in the direct current high voltage electric system. In a second step 204, the main disconnection component is activated, and the clamping circuit is temporarily absorbing at least a part of an excess energy present as an overcurrent in the direct current high voltage electric system at the time of activating the main disconnection component.

Figure 5:
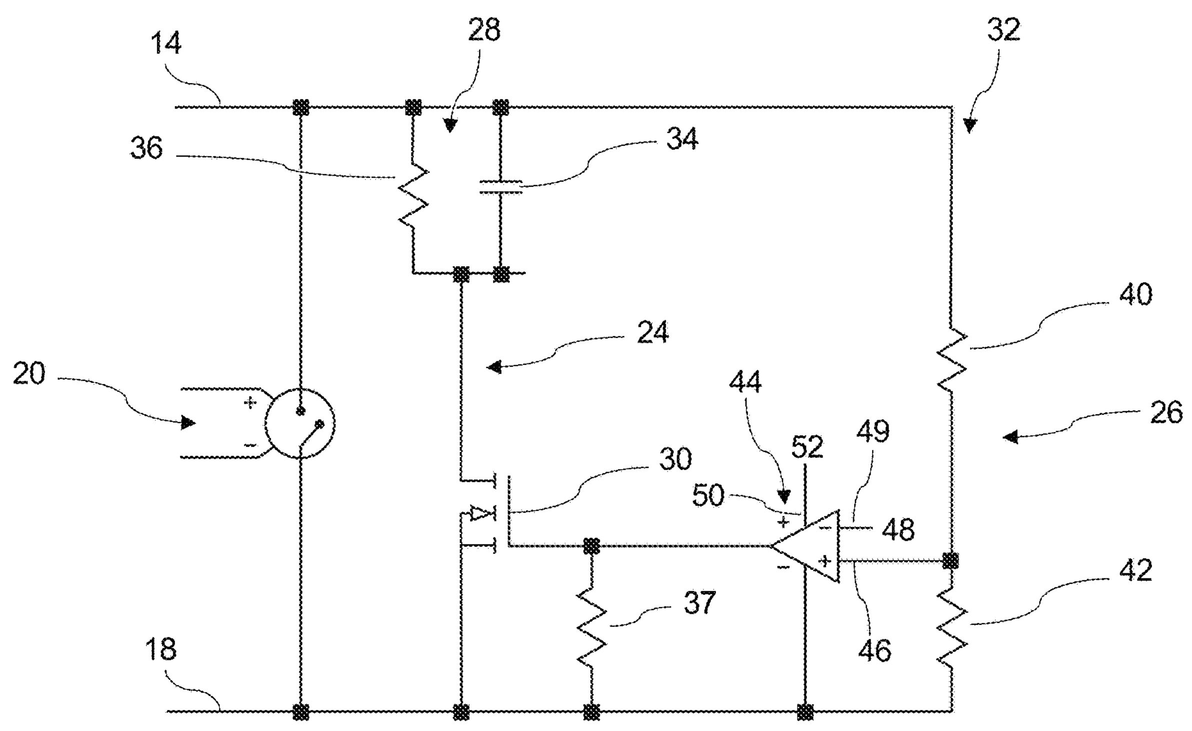
FIG. 5 shows an example of a configuration of the electrical arrangement of FIG. 1.

FIG. 5 shows an example of a configuration of the electrical arrangement 10 of FIG. 1. As an option, the storage coupling 28 of the first connecting path 24 comprises a capacitor 34 and a first resistor 36 in a parallel connection. As an additional or alternative option (see e.g. FIG. 6), the storage coupling 28 also comprises a second resistor 38 in series with the parallel connection of the capacitor 34 and the first resistor 36.

The capacitor 34 is constantly discharged via the first resistor 36.

The capacitor 34 is connected to the input terminal 14 on the one side and to the activatable switch 30 on the other side.

The first resistor 36 can also be referred to as discharge resistor.

The second resistor 38 is provided as an additional option in combination with the first resistor 36 and the capacitor 34. The second resistor 38 is coupled between the parallel connection and the activatable switch 30.

The second resistor 38 restricts the current flow and also absorbs energy.

In an example, the capacitor 34 is provided in a non-charged state.

In an option, the main disconnection component 20 is provided as a semiconductor switch that provides a connection in a first state and that is blocked in a second state when exceeding a predetermined threshold current.

In an option, the semiconductor switch is bridged by a diode element connected to the input terminal with its cathode.

In another option, the activatable switch 30 comprises a semiconductor switch that is blocked in a first state and that provides a connection to the output terminal in a second state.

In a further option, the activatable switch 30 comprises an enhancement type field-effect-transistor, which is connected to the storage coupling 28 with its drain connector, to the output terminal 18 with its source connector and to the supply coupling 32 with its gate.

In a normal state, the switch is open, and the capacitor does not get loaded or charged.

As another option, a pull down resistor 37 is connected between the gate and the output terminal 18. As an additional option (see FIG. 6), an overvoltage protection diode 39 is connected between the gate and the output terminal 18. The overvoltage protection diode 39 can also be referred to as transorber, with the same reference numeral 39. The resistor 37 is a pull-down resistor to keep the activatable switch 30 closed. The pull-down resistor 37 pulls the gate to zero, such that the transistor is turned off, in case that there is no supply, which avoids unwanted charge of the gate capacitance. The transorber 39 is provided as a gate protection. The transorber 39 is also referred to as transient voltage suppression diode. The transorber 39 is provided as additional option to the pull down resistor 37.

In an option, shown in FIG. 5, the first resistor 36 with the capacitor 34 in parallel connection are provided connected to the activatable switch 30. The first and second coupling resistors 40, 42 are provided together with the trigger element 44 as well as the pull down resistor 37.

Figure 6:
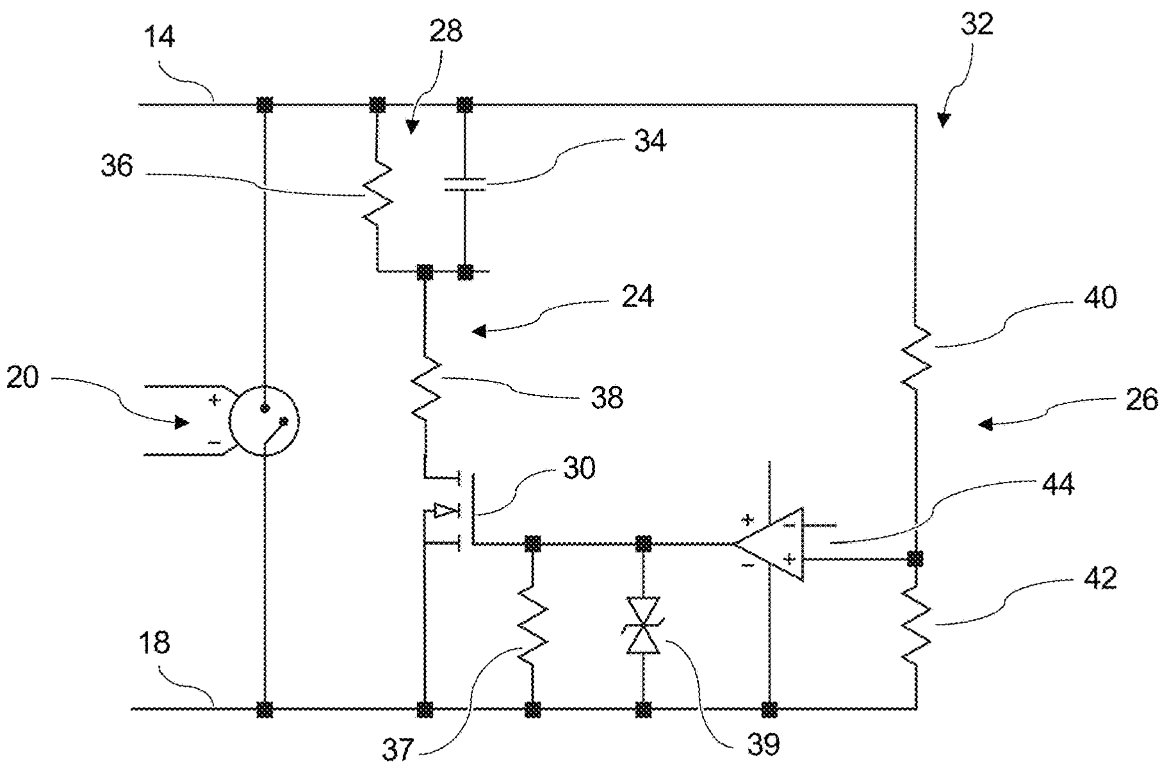
FIG. 6 shows another example of a configuration of the electrical arrangement of FIG. 1.

FIG. 6 shows another example of a configuration of the electrical arrangement 10 of FIG. 1. As an option, the supply coupling 32 comprises a first coupling resistor 40 and a second coupling resistor 42 connected in series between the input terminal 14 and the output terminal 18. Further, a trigger element 44 is provided that comprises an input voltage terminal 46 connected to a connection point between the first coupling resistor 40 and the second coupling resistor 42 with its positive connector, and to a reference voltage connection 48 with its negative connector 49. The reference voltage connection 48 is also referred to as $V_{ref}$. Further, the trigger element 44 comprises a supply voltage terminal 50 connected to a supply source 52 with its positive connector and to the output terminal 18 with its negative connector. The supply source 52 is also referred to as $V_{supply}$. When the voltage present at the connection point between the first coupling resistor 40 and the second coupling resistor 42 exceeds a predetermined threshold, the trigger element 44 is configured to provide a switch supply voltage to the gate of the activatable switch 30 in order to close the activatable switch 30 for activating the storage coupling 28.

The first and second coupling resistor 40, 42 provide a dividing of the voltage in half design, to fit the needs of the control circuit to switch at the desired voltage.

In an option, shown in FIG. 6, the first resistor 36 with the capacitor 34 in parallel connection are provided together with the second resistor 38 in series connection connected to the activatable switch 30. The first and second coupling resistors 40, 42 are provided together with the trigger element 44 as well as the transorber and the pull down resistor.

Figure 7:
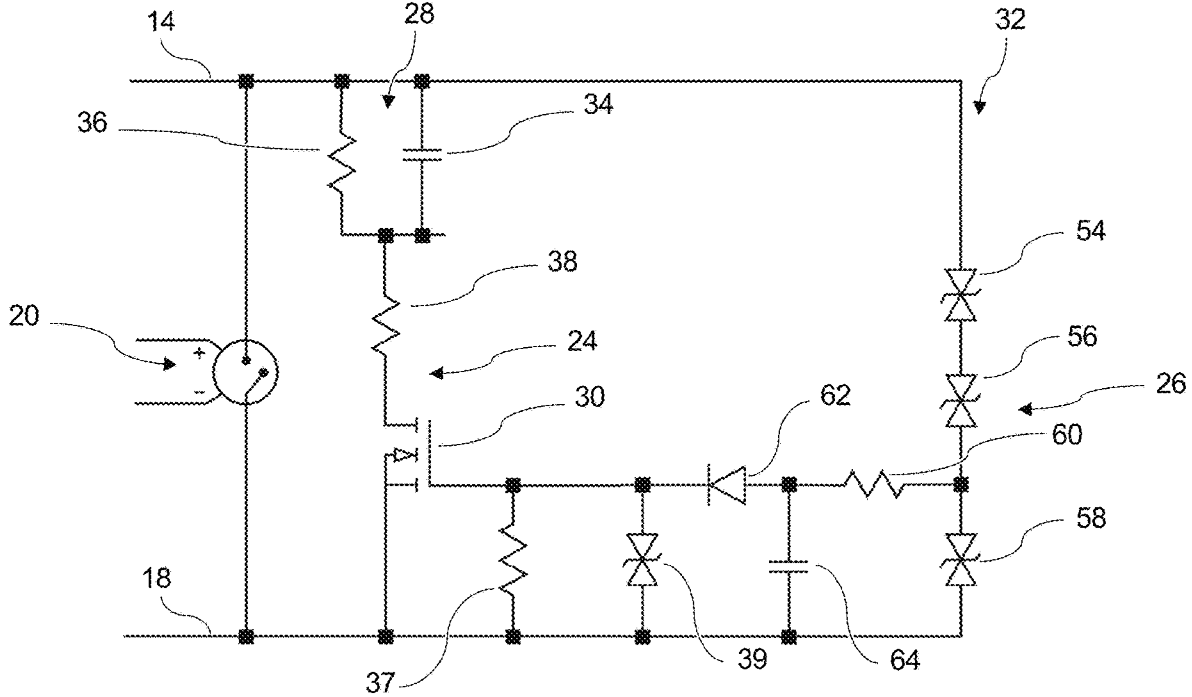
FIG. 7 shows a further example of a configuration of the electrical arrangement of FIG. 1.

FIG. 7 shows a further example of a configuration of the electrical arrangement 10 of FIG. 1. As an option, the supply coupling 32 comprises a first transorber 54, a second transorber 56 and a third transorber 58 connected in series. A supply resistor 60 is connected to a connection point of the second transorber 56 and the third transorber 58, and a supply diode 62 is connected between the supply resistor 60 and the activatable switch 30. The supply diode 62 is connected to the supply resistor 60 with its anode end. Further, a supply filter capacitor 64 is connected between a connection point of the supply resistor 60 and the supply diode 62.

In an example, the supply filter capacitor 64 acts as a low pass filter together with the supply resistor 60.

The supply resistor 60, the supply diode 62 and the supply filter capacitor 64 are referencing to the transorber setup.

As an advantage, an external supply voltage is not needed for activating, i.e. operating the activatable switch.

The first, second and third transorbers 54, 56, 58 provide a voltage dependent series connection. The first and second transorbers 54, 56 may be provided as higher-voltage transorbers. The third transorber 58 is configured for a lower gate voltage for the activatable switch 30.

In an example (see FIG. 6), the pull down resistor 37 and the transorber 39 are provided in combination with the first coupling resistor 40 and the second coupling resistor 42 connected in series and the trigger element 44.

In another example (see FIG. 7), the pull down resistor 37 and the transorber 39 are provided in combination with the first transorber 54, the second transorber 56 and the third transorber 58 connected in series, as well as the supply resistor 60 and the supply diode 62 and the supply filter capacitor 64.

In an option, shown in FIG. 7, the first resistor 36 with the capacitor 34 in parallel connection are provided together with the second resistor 38 in series connection connected to the activatable switch 30. The first transorber 54, the second transorber 56 and the third transorber 58 are provided together with the supply resistor 60, the supply diode 62 and the supply filter capacitor 64 as well as the transorber 39 and the pull down resistor 37.

In an example, the electrical arrangement is provided as a uni-directional electrical arrangement comprising the main disconnection component.

The electrical arrangement is provided for a use in the field of power electronics to solve problems during switching, such as opening of a fuse or a safety switch, in high power DC networks. The electrical arrangement provides high performance overvoltage clamping and ensures a proper operation of such networks in case of a failure where the safety element, e.g., fuse, is triggered.

The electrical arrangement provides a controlled electronic solution to overcome existing problems.

The version shown in FIG. 7 also comes with a redundancy feature and does not require an auxiliary voltage supply. Also the energy distribution and switch protection during switching or fuse blow is considered.

According to an aspect, a solution is provided for clamping overvoltages generated when a DC network is opened, e.g., a fuse, in case of failure. The active current, or even worse, failure current, comes with a high amount of stored energy in the unavoidable parasitic inductances of the cables/network. When the safety element triggers and opens the circuit, this energy is absorbed to avoid very high overvoltage. To preclude this and protect the residual network from overvoltage, protection is provided. The electrical arrangement provides improved flexibility and enhanced performance. Further, redundancy concepts can be combined with reasonable weight compared to actual solutions. The electrical arrangement benefits from a combination of a fast and controllable energy storage and clamping method based on a fast semiconductor switch with fast analog control circuit. This solution enables increased functionalities compared to the actual solutions.

This solution is intended to be used for network and energy storage reconfiguration, switching and protection.

The topology of active controlled hybrid clamping circuit with energy distribution and redundancy shown in FIG. 7 provides the benefits that main energy is stored in the capacitor, and that the capacitor max. voltage has not to respect the overall operating voltage but the considered energy to clamp. A further benefit is that the rest of the energy is distributed, and that the switch current is limited by the resistor, since the resistor also takes some energy. A still further benefit is that no power supply is needed, and that some redundancy is implemented e.g., in case of failure at the controlled switch. The transorbers are still active; and the capacitor is discharged by the resistor.

The topology of active controlled hybrid clamping circuit with energy distribution and high accuracy shown in FIG. 6, provides the benefits that the main clamping energy is stored in the capacitor, and that the capacitor max. voltage has not to respect the overall operating voltage but the considered energy to clamp switch current is limited by the resistor and the resistor also takes some energy and a simplified circuit with high clamping accuracy is provided with the capacitor discharged by the resistor.

The topology of active controlled hybrid clamping circuit with high accuracy shown in FIG. 5 provides the benefits that the clamping energy is stored mainly in the capacitor which results in no heating of further components. The capacitor max. voltage has to respect the overall operating voltage but the considered energy to clamp. In the very simple circuit, only the essential components are considered but high clamping accuracy is still given. And the capacitor is discharged by the resistor.

Figure 8:
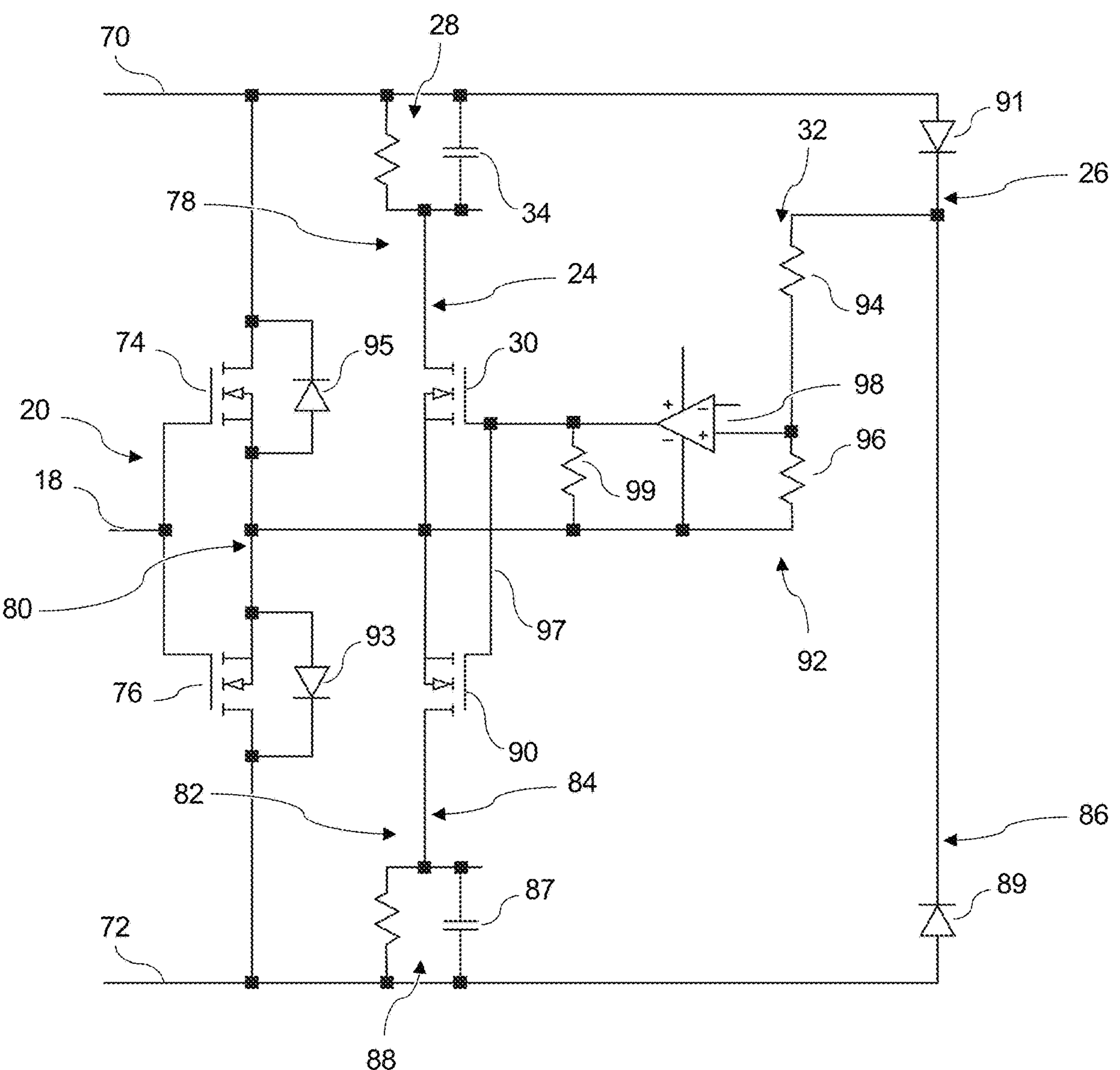
FIG. 8 shows an example of a bi-directional electrical arrangement for protection in a direct current high voltage electric system.

FIG. 8 shows an example of a bi-directional electrical arrangement for protection in a direct current high voltage electric system. The input connection comprises a first input terminal 70 and a second input terminal 72. The main disconnection component 20 comprises a first main disconnection element 74 between the first input terminal 70 and the output terminal 18, and a second main disconnection element 76 between the second input terminal 72 and the output terminal 18. The clamping circuit 22 is provided as a first clamping circuit 78 between the first input terminal 70 and a midpoint terminal 80. Further, a second clamping circuit 82 is provided between the second input terminal 72 and the midpoint terminal 80. The first clamping circuit 78 has the first connecting path 24 and the second connecting path 26. The second clamping circuit 82 has a third connecting path 84 and a fourth connecting path 86, arranged in parallel to each other. The third connection path 84 comprises a second storage coupling 88 with a second capacitor 87 for temporarily buffering an overvoltage present between the second input terminal and the midpoint terminal. The third connection path 84 also comprises a second activatable switch 90 for selectably connecting the second storage coupling with the output terminal 18. The fourth connection path comprises a second supply coupling 92 for operating the second activatable switch in dependency of the overvoltage. The second connection path 26 and the fourth connection path 86 are provided at least partly as a shared connection path. As an example, the second supply coupling 92 is provided as the (first) supply coupling 32. In other words, a common supply coupling is provided shared by the two connecting paths 24, 84.

The second connecting path 26 is provided with a first diode 91 controlling a first current flow direction for the first clamping circuit 78. The fourth connecting path 86 is provided with a second diode 89 controlling a second current flow direction for the second clamping circuit 82.

The midpoint terminal 80 is provided as a common source.

In an example, the shared connection path comprises a first coupling resistor 94 and a second coupling resistor 96 connected in series between an input connection terminal and the output terminal. A common trigger element 98 is provided that comprises an input voltage terminal connected to a connection point between the first coupling resistor and the second coupling resistor with its positive connector and to a reference voltage connection with its negative connector; and a supply voltage terminal connected to a supply source with its positive connector and to an output terminal with its negative connector. When the voltage present at the connection point between the first coupling resistor and the second coupling resistor exceeds a predetermined threshold, the trigger element is configured to provide a switch supply voltage to the gate of the first activatable switch and the second activatable switch in order to close the first activatable switch and the second activatable switch.

Further, a common pull down resistor 99 is provided. A connection 97 connects the common supply coupling to the second activatable switch 90.

In an example, the main disconnection component 20 comprises a first semiconductor switch that provides a connection in a first state and that is blocked in a second state, and a second semiconductor switch that provides a connection in a first state and that is blocked in a second state. Each of the semiconductor switches is bridged by a diode element 95, 93 connected to the respective input terminal with its cathode.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical arrangement for protection in a direct current high voltage electric system, the arrangement comprising:
- an input connection with an input terminal;
- an output connection with a output terminal;
- a main disconnection component between the input terminal and the output terminal; and
- at least one clamping circuit between the input terminal and the output terminal,
- wherein the at least one clamping circuit has a first connecting path and a second connecting path, arranged in parallel to each other;
- wherein the first connection path comprises:
  - a storage coupling for temporarily buffering an overvoltage present between the input terminal and the output terminal; and
  - an activatable switch for selectably connecting the storage coupling with the output terminal; and
- wherein the second connection path comprises:
  - a supply coupling for operating the activatable switch in dependency of the overvoltage;
  - wherein the supply coupling comprises a first transorber, a second transorber and a third transorber connected in series;
  - wherein a supply resistor is connected to a connection point of the second transorber and the third transorber;
  - wherein a supply diode is connected between the supply resistor and the activatable switch; and
  - wherein a supply filter capacitor is connected between a connection point of the supply resistor and the supply diode.

2. The electrical arrangement according to claim 1, wherein the main disconnection component comprises:
- i) a safety element configured to open an electrical circuit in the direct current high voltage electric system in order to protect at least a part of the electrical circuit; or
- ii) a fuse that opens the connection when exceeding a predetermined threshold current.

3. The electrical arrangement according to claim 1, wherein the main disconnection component is provided as a semiconductor switch that provides a connection in a first state and that is blocked in a second state when exceeding a predetermined threshold current.

4. The electrical arrangement according to claim 1, wherein the storage coupling comprises a capacitor and a first resistor in a parallel connection; and
- wherein the storage coupling further comprises a second resistor in series with the parallel connection of the capacitor and the first resistor.

5. The electrical arrangement according to claim 1, wherein the activatable switch comprises a semiconductor switch that is blocked in a first state and that provides a connection to the output terminal in a second state.

6. The electrical arrangement according to claim 1, wherein the activatable switch comprises an enhancement field-effect-transistor, which is connected to the storage coupling with a drain connector, to the output terminal with a source connector and to the supply coupling with a gate.

7. The electrical arrangement according to claim 1, wherein the supply coupling comprises a first coupling resistor and a second coupling resistor connected in series between the input terminal and the output terminal;
- wherein a trigger element is provided that comprises
  - an input voltage terminal connected to a connection point between the first coupling resistor and the second coupling resistor with a positive connector and to a reference voltage connection with a negative connector; and
  - a supply voltage terminal connected to a supply source with a positive connector and to output terminal with a negative connector; and
- wherein, when the voltage present at the connection point between the first coupling resistor and the second coupling resistor exceeds a predetermined threshold, the trigger element is configured to provide a switch supply voltage to a gate of the activatable switch in order to close the activatable switch for activating the storage coupling.

8. The electrical arrangement according to claim 1, wherein the supply diode is connected to the supply resistor with an anode end.

9. The electrical arrangement according to claim 6, wherein a pull down resistor is connected between the gate and the output terminal; and wherein an overvoltage protection diode is connected between a gate and the output terminal.

10. The electrical arrangement according to claim 1, wherein the electrical arrangement is provided as a bi-directional electrical arrangement;

wherein the input connection comprises a first input terminal and a second input terminal;

wherein the main disconnection component comprises a first main disconnection element between the first input terminal and the output terminal; and a second main disconnection element between the second input terminal and the output terminal;

wherein the at least one clamping circuit is provided as a first clamping circuit between the first input terminal and a midpoint terminal; and wherein a second clamping circuit is provided between the second input terminal and the midpoint terminal;

wherein the first clamping circuit has the first connecting path and the second connecting path; and wherein the second clamping circuit has a third connecting path and a fourth connecting path, arranged in parallel to each other;

wherein the third connection path comprises a second storage coupling for temporarily buffering an overvoltage present between the second input terminal and the midpoint terminal; and a second activatable switch for selectably connecting the second storage coupling with the output terminal; and wherein the fourth connection path comprises a second supply coupling for operating the second activatable switch in dependency of the overvoltage; wherein the second connection path and the fourth connection path are provided at least partly as a shared connection path.

11. An electric system with a direct current network, the system comprising:

at least one source;

at least one load; and the electrical arrangement according to claim 1;

wherein the at least one source is selected from a group consisting of: batteries, super capacitors, fuel cells, solar cells, power network and combinations thereof;

wherein the at least one load comprises at least one load selected from a group consisting of: electrical engines, electric drives, electric motors, and electric actuators;

wherein the at least one source is connected to the at least one load via an electric connection; and wherein the electrical arrangement is provided within the electric connection such that the main disconnection component is configured to temporarily disconnect the least one load from the at least one source.

12. The electric system according to claim 11, wherein the electric system is provided on board of a vehicle selected from a group consisting of: an aircraft and an automotive.

13. The electric system according to claim 11, wherein the electrical arrangement is configured to handle voltages larger than 800 V and currents larger than 1000 A.

14. An aircraft comprising:

a fuselage structure comprising a use portion;

a lift and propulsion structure connected to the fuselage structure; and the electric system according to claim 1;

wherein the electric system is configured to be at least temporarily used for an operation of the aircraft.

15. A method for protected switching in a direct current high voltage electric system, the method comprising:

providing the electrical arrangement of claim 1 in the direct current high voltage electric system; and activating the main disconnection component;

wherein the at least one clamping circuit temporarily absorbs at least a part of an excess energy present as an overcurrent in the direct current high voltage electric system at the time of activating the main disconnection component.

16. An electrical arrangement for protection in a direct current high voltage electric system, the arrangement comprising:

an input connection with an input terminal;

an output connection with a output terminal;

a main disconnection component between the input terminal and the output terminal; and at least one clamping circuit between the input terminal and the output terminal, wherein the at least one clamping circuit has a first connecting path and a second connecting path, arranged in parallel to each other;

wherein the first connection path comprises:

a storage coupling for temporarily buffering an overvoltage present between the input terminal and the output terminal; and an activatable switch for selectably connecting the storage coupling with the output terminal; and wherein the second connection path comprises a supply coupling for operating the activatable switch in dependency of the overvoltage;

wherein the electrical arrangement is provided as a bi-directional electrical arrangement;

wherein the input connection comprises a first input terminal and a second input terminal;

wherein the main disconnection component comprises a first main disconnection element between the first input terminal and the output terminal; and a second main disconnection element between the second input terminal and the output terminal;

wherein the at least one clamping circuit is provided as a first clamping circuit between the first input terminal and a midpoint terminal; and wherein a second clamping circuit is provided between the second input terminal and the midpoint terminal;

wherein the first clamping circuit has the first connecting path and the second connecting path; and wherein the second clamping circuit has a third connecting path and a fourth connecting path, arranged in parallel to each other;

wherein the third connection path comprises a second storage coupling for temporarily buffering an overvoltage present between the second input terminal and the midpoint terminal; and a second activatable switch for selectably connecting the second storage coupling with the output terminal; and wherein the fourth connection path comprises a second supply coupling for operating the second activatable switch in dependency of the overvoltage; wherein the second connection path and the fourth connection path are provided at least partly as a shared connection path.

* * * * *